United States Patent [19]

Moran

[11] 4,147,327
[45] Apr. 3, 1979

[54] METALLIC SEALS FOR BALL VALVE

[75] Inventor: George A. Moran, Houston, Tex.

[73] Assignee: ACF Industries, Incorporated, New York, N.Y.

[21] Appl. No.: 807,281

[22] Filed: Jun. 16, 1977

[51] Int. Cl.² .............................................. F16K 5/06
[52] U.S. Cl. .................................. 251/174; 251/172; 251/181; 251/315
[58] Field of Search ............... 251/315, 174, 181, 192, 251/172; 137/242

[56] References Cited

U.S. PATENT DOCUMENTS

| | | | |
|---|---|---|---|
| 2,573,177 | 10/1951 | Bohlen | 251/174 |
| 3,077,902 | 2/1963 | Vickery | 251/315 |
| 3,108,779 | 10/1963 | Anderson | 251/315 |
| 3,177,887 | 8/1965 | Priese | 251/181 |
| 3,269,693 | 8/1966 | Gulick | 251/315 |
| 3,301,523 | 1/1967 | Lowery | 251/328 |
| 3,394,915 | 7/1968 | Gachot | 251/174 |
| 3,570,811 | 3/1971 | Kruschik | 251/174 |
| 3,721,425 | 3/1973 | Jones et al. | 251/315 |
| 3,841,347 | 10/1974 | Kushiba | 137/242 |
| 4,061,307 | 12/1977 | Yoshiike et al. | 251/174 |

*Primary Examiner*—Martin P. Schwadron
*Assistant Examiner*—H. Jay Spiegel
*Attorney, Agent, or Firm*—Eugene N. Riddle

[57] ABSTRACT

A ball or spherical plug valve has a pair of annular metallic seal rings mounted in grooves in the valve chamber around the inlet and outlet passageways of the valve body. Each metallic seal ring is of a one-piece generally uniform angled cross-section to form a leg portion and a free lip portion. The free lip portion extends transversely of the longitudinal axis of the passageways and a substantially continuous line contact is provided between an inner annular edge portion of the free lip portion and the valve member. The lip portion is bent from a free position substantially perpendicular to the leg portion to a substantially frusto-conical position when the valve is assembled so the seal ring acts as a spring to urge itself against the ball valve member to maintain sealing contact.

8 Claims, 8 Drawing Figures

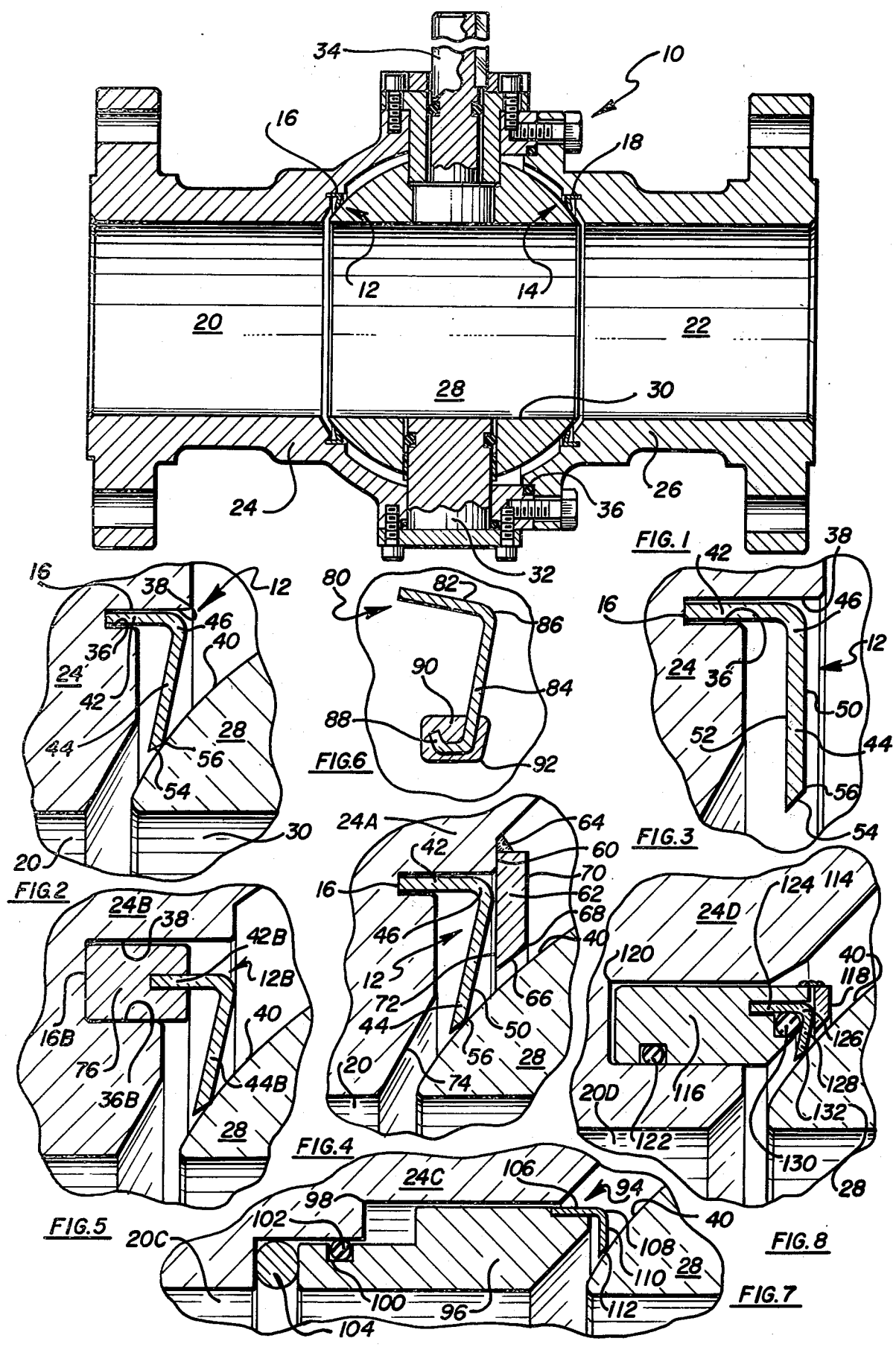

4,147,327

METALLIC SEALS FOR BALL VALVE

BACKGROUND OF THE INVENTION

This invention is related to seals for ball valves or so called spherical plug valves which have the seal ring and the valve member constructed of metallic materials in order for the valve to withstand operation in a high temperature environment. This invention is related to ball valves which have seals formed of relatively thin deformable annular metallic members which will flex upon movement of the ball to maintain sealing engagement with the ball in all operating positions.

In the known prior art several patents are known which disclose ball valves having thin annular seal members disposed generally radially in the valve body around the flow passageways. These patents are Clade U.S. Pat. Nos. 2,890,856 and 2,942,840, R. P. Kulisek U.S. Pat. No. 3,056,576, and K. Kushida U.S. Pat. No. 3,841,347. These patents disclose seal rings made of a composite metallic and non-metallic material as well as seal rings of a solid metallic material. In these valves the seal rings are clamped in the valve body around the perimeter of the individual seal rings. One disadvantage of the peripherally mounted seal ring construction shown in these patents is that precise sizing of the parts and assembly of the valve is required to properly clamp the seal ring so the portions which support it in the valve body are not over-stressed, unduly deformed or otherwise damaged. The use of composite metallic and non-metallic seal rings in such valves is not acceptable for high temperature applications because the non-metallic material will decompose quickly at elevated temperatures. The patent of Kushida, U.S. Pat. No. 3,841,347, shows the use of several layers of metals to form a seal ring, however, this is also believed to be unacceptable for high temperature applications because of the inherent variation in thermal expansion characteristics of the different materials.

SUMMARY OF THE INVENTION

In an embodiment of this invention a seal assembly for a ball valve is provided which has a unitary metal seal ring mounted with the valve body and in contact with the valve member. The seal ring has an angular cross-section with a leg portion that is anchored in a groove in the valve body and a free lip portion that contacts the ball member. The free lip has a sharp edge that contacts the ball member.

One object of this invention is to provide a metallic ball valve seal structure overcoming the aforementioned disadvantages of the prior art devices.

Still, one other object of this invention is to provide a ball valve having an all metallic seal having a single piece seal ring which is suitable for high temperature applications.

Various other objects, advantages, and features of this invention will become apparent to those skilled in the art from the following discussion, taken in conjunction with the accompanying drawings, in which:

DESCRIPTION OF THE DRAWINGS

FIG. 1 is a cutaway view of a ball valve employing the metallic seat member of this invention with the valve shown in the open position;

FIG. 2 is an enlarged fragmentary cross-sectional view of the seal ring, a portion of the ball member, and a portion of the valve body removed from the valve shown in FIG. 1;

FIG. 3 is an enlarged fragmentary view of a portion of the valve body and the seal ring for the valve shown in FIG. 1 with the seal ring in a free and unrestrained position;

FIG. 4 is an enlarged cross-sectional fragmentary view of an alternate valve body construction utilizing the seal ring of this invention wherein the valve body has a seal ring retainer mounted to retain the seal ring in the groove;

FIG. 5 is an enlarged fragmentary cross-sectional view of a portion of a valve body and ball member in a valve employing an alternate seal construction of this invention wherein the seal ring is mounted in a support member and the support ring is mounted in the groove;

FIG. 6 is a cross-sectional elevation view of an alternate seal ring construction of this invention wherein a seal face ring is provided around the annulus portion of the seal ring to contact the valve member;

FIG. 7 is an enlarged fragmentary cross-sectional view of a portion of a valve body and ball member of a valve employing an alternate seal ring construction of this invention wherein the seal ring is secured to a seat member that is mounted in a groove that opens to the inlet and outlet passageways and to the valve chamber; and FIG. 8 is an enlarged cross-sectional fragmentary view of a portion of a valve body and ball member of a valve employing an alternate seat construction of this invention wherein the seal ring is mounted in a seat member and provided with a retainer.

The following is a discussion and description of preferred specific embodiments of the metallic seal ring structure for a ball valve of this invention, such description being made with reference to the drawing, whereupon the same reference numerals are used to indicate the same or similar parts and/or structure. It is to be understood that such discussion and description is not to unduly limit the scope of this invention.

DETAILED DESCRIPTION

Referring to the drawing in detail and in particular to FIG. 1, a trunnion mounted style ball valve, indicated generally at 10, is shown with the seal ring structure of this invention. The seal ring structure of this invention includes a pair of metallic seal rings indicated generally at 12 and 14 which are mounted in the valve chamber in grooves 16 and 18 respectively around the flow passageways 20 and 22 respectively. The valve body includes a main body 24 and a removably mounted tailpiece 26 with the valve body cavity or valve chamber defined therebetween. In the valve shown, tailpiece 26 is bolted to main body 24. Ball member 28 has a passageway 30 therethrough. Ball member 28 is rotatably mounted in the valve chamber for movement between open and closed positions relative to passageways 20 and 22. Ball member 28 is supported by a trunnion shaft or journal 32 in the bottom portion thereof and by stem 34 attached to the upper portion thereof. Stem 34 extends through a bearing in main body 24 and is secured to ball member 28 to insure rotation of these members together. Trunnion shaft 32 is rigidly secured to main body portion 24 so that ball member 28 can be rotated by stem 34 relative to the valve body. A peripheral body seal 36 is provided between main body 24 and tailpiece 26.

FIG. 2 shows seal ring 12 along with a portion of main body 24 and ball member 28 in an enlarged fragmentary view. The seal ring construction shown in FIG. 2 is representative of the seal ring and groove structure in both main body 24 and tailpiece 26. The groove 16 is spaced radially outward of flow passageway 20 and formed between an inner groove side 36 and an outer groove side 38. Groove sides 36 and 38 are substantially parallel and arranged coaxially with flow passageway 20. Ball member 28 is a typical ball valve member having a substantially spherically shaped exterior surface 40 which contours smoothly to a passageway therethrough. Seal ring 12 is a one-piece or unitary metal ring that has an angled cross-section. Seal ring 12 has a leg portion or cylindrically shaped outer portion 42 which joins a lip portion or generally radially disposed portion 44. The leg or cylindrically shaped outer portion smoothly curves into the lip or generally radially disposed portion.

FIG. 3 shows seal ring 12 in a free position mounted in groove 16. The smoothly curved portion 46 between leg portion 42 and lip portion 44 provides a smooth transition between the two seal ring portions and allows lip portion 44 to flex or move in a pivoting motion relative to the outer portions of the seal ring. Furthermore, the smoothly curved portion of seal ring 12 allows the seal ring to function as a spring thereby urging itself into engagement with the ball member. With the seal ring in the free position as shown in FIG. 3, lip portion 44 is substantially perpendicular to leg portion 42. However, when the valve is assembled the lip portion is deformed to a substantially frusto-conical shape as shown in FIG. 2 where the radially inner end portion thereof contacts the exterior spherical surface 40 of ball member 28. Seal ring 12 is formed of a thin piece of metal so it can be easily slipped into groove 16 and so it will flex as needed in curved portion 46 when radially disposed portion 44 is flexed or deflected. Seal ring 12 can be substantially uniform in cross-section as shown or it can have a tapered cross-section with any portion thereof being thinner to promote stiffness or flexure of the lip portion. Lip portion 44 has an inner side 50 closest to ball member 28 and an outer side 52. An annular edge portion 54 connects inner side 50 to outer side 52. Annular edge portion 54 is oriented at an angle relative to leg portion 42 and sides 50 and 52 when the seal ring is in the free position thereby forming a sharp edge 56 at the juncture of annular portion 54 and inner side 50. The sharp edge 56 contacts ball member spherical surface 40 and seals in a line contact around the annulus of the seal ring. Annular edge 54 must necessarily be oriented relative to inner side 50 such that only sharp edge 56 will contact ball member spherical surface 40.

In operation of the valve seal ring 12 sharp edge 56 maintains a seal around valve member 28 because of the deflection of lip portion 44. This deflection of lip portion 44 creates forces on seal ring 12 to urge leg portion 42 radially outward into sealing contact with groove outer side 38 and into the closed end of the groove so that fluid can be contained on either side of seal ring 12. With the valve in the open position as shown in FIGS. 1 and 2, fluid in the flow passageway 20 will assist sealing of the valve when pressure in the valve chamber is less than pressure in the flow passageway. This is due to a resultant fluid pressure being exerted on seal ring side 52 urging it toward the valve member. When the pressure in the valve chamber raises above pressure in the flow passageway, then seal ring sharp edge 56 will move away from the ball member and thus relieve the excess body pressure. Deflection of the seal ring lip portion 44 is caused by differential pressure on the seal ring.

Because all components of the seal assembly are metallic, elevated temperatures will not significantly effect the valve's sealing capability. The selection of material for seal ring 12 is obviously a choice of design, however, such is necessarily selected from materials which will retain their resiliency at elevated temperatures and thereby providing a continuous force urging lip portion 44 into contact with ball member 28.

The following paragraphs are descriptions of various other embodiments of the seal structure of this invention. Because the ball member is the same for all such embodiments it is identified by numeral 28. Because the body is similar in some respects it is identified by numeral 24 followed by a letter.

FIG. 4 shows a modification of the seal structure of this invention. In this modification the seal ring 12, groove 16, and ball member 28 are the same as described above and for this reason have the same numerals. The valve body is constructed slightly different in that the valve chamber portion excludes groove 16 and for this reason the body is identified by numeral 24A. The valve body 24A is provided with a radially disposed shoulder 60 disposed in a plane which is spaced slightly toward the ball member from the location of seal ring inner side 50 when seal ring 12 is in the free position. An annular seal ring retainer member 62 rests on annular shoulder 60 and extends radially inward over seal ring curved portion 46. The outer perimeter of seal ring retainer 62 is secured to valve body 24A by a weld 64. The inner annular portion of seal ring retainer 62 is provided with a beveled interior surface 66 which is located in a spaced relation to ball member spherical surface 40. Seal ring retainer 62 has a sharp edge defined at the juncture of interior surface 66 and an inner side 70. The outer side 72 of seal ring retainer abuts shoulder 60 and will lie adjacent to the seal ring inner side 50 when the seal ring is in the free position. Valve body 24A has an inclined surface 74 extending radially outward from flow passageway 20A and terminating at a point radially outward of seal ring annular edge 54. The spacing and orientation of inclined surface 74 and seal ring retainer 62 is such that in the event of failure of bearings or other supporting structure for ball member 28 which would cause a displacement of the ball member in the direction of the seal ring then spherical surface 40 will contact seal ring retainer sharp edge 68 before seal ring radially disposed portion 44 is moved into contact with valve body inclined surface 74. This specific spacing is done so the metal-to-metal emergency or so called fire-safe seal is created between ball member 28 and the seal ring retainer 62 and sealing is also maintained between seal ring 12 and ball member 28. The seal created between sharp edge 68 and ball member 28 is an auxiliary seal which becomes important in an emergency or fire condition where temperatures may be above the temperature at which seal ring 12 will remain resilient and function adequately as a seal.

FIG. 5 illustrates a further embodiment or modification of the seal ring structure of this invention. In this embodiment the valve body is identified at 24B and seal ring at 12B. Valve body 24B is constructed with an enlarged groove 16B coaxial with flow passageway 20B and having an inner side 36B and an outer side 38B with the sides substantially spaced apart. Seal ring 12B has a cylindrically disposed outer portion or leg portion 42B and a lip portion or radially disposed portion 48B similar to that described above. Seal ring leg portion 42B is mounted in a seal ring annular support member 76. Annular support member 76 is a parallel sided and axially elongated ring which has a seal ring cylindrical portion 42B mounted in one side thereof. Annular support member 76 can be rigidly secured to seal ring 12B by molding, bonding, welding, or other methods. Annular support member 76 can be sized such that it must be pressed into groove 16B which will retain the seal ring in place and simultaneously provide for fluid sealing around the perimeter of the seal structure. If desired, support ring 76 can be sized to slip easily into groove 16B with force from deflection of the seal ring being utilized to insure sealing around the outer perimeter of the seal structure.

FIG. 6 illustrates another embodiment of the seal ring of this invention wherein an additional edge seal is provided on the seal ring. The seal ring shown in FIG. 6 is indicated generally at 80 and includes a cylindrically disposed outer portion or leg portion 82 which connects to the radially disposed or lip portion 84 by a smoothly curved portion 86 the same as that described previously. The annular edge portion of lip portion 84 is provided with a curled annular edge 88 turned radially outward in the direction of leg portion 82 in a generally cross-sectional "J" shaped shape. Annular edge portion 88 is provided with an edge cover 90 formed therearound as shown. Edge cover 90 enclose both sides of the inner annular edge portion of radially disposed portion 84 as shown and it is provided with a sharp edge 92 on what is the inner side of the annular edge portion. The sharp edge 92 will contact the spherical surface of the ball member like the seal rings described above. Edge cover 90 can be a softer and more resilient metallic material than the other portions of the seal ring in order to provide a more resilient or readily deformable contact surface to rub against the spherical surface of the valve member. An advantage of using such an edge cover material is to provide a seal ring that will conform to the ball member exterior surface easily, thus, compensate for imperfections in the surface finish. This embodiment of the seal ring structure provides for a combination of metallic material to provide one material with desirable sealing characteristics to contact with the ball member and another material having desirable spring characteristics to urge the edge cover portion into sealing contact with the valve member.

FIG. 7 illustrates another embodiment of the seal ring structure of this invention wherein seal ring indicated generally at 94 is supported by an annular carrier member 96 that is mounted in a groove 98 around flow passageway 20C and the valve body 24C. Groove 98 opens to flow passageway 20C and to the valve chamber. Seal carrier 96 is provided with an outside peripheral groove 100 to mount a peripheral seal such as an O-ring 102 or other suitable seal ring to insure sealing between the perimeter of the seal carrier 96 and valve body 24C. A spacer ring 104 is a cut or segmented ring which is inserted between seal carrier 96 and the end of groove 98 to space the seal carrier appropriately for installation of the ball member or for adjusting the bias of the seal ring. Seal ring 94 is constructed with a cylindrically disposed portion 106 which connects by a smoothly curved portion 108 to a radially disposed portion 110. The inner annular edge portion of seal ring 94 is provided with a sharp edge 112 to contact the spherical exterior surface of ball member 28. The cylindrically disposed or leg portion of seal ring 94 can be rigidly secured to seal carrier 96 such as by welding, molecular bonding, or other methods of attachment. Deflection of the radially disposed or lip portion 110 can deform the adjoining portion of leg portion 106 to provide sealing between the seal ring and carrier 96 in the event the seal ring is not secured to the carrier by some means which would accomplish sealing. Functionally, the seal ring embodiment shown in FIG. 7 will enable this seal ring invention to be used in top entry style valves wherein the seats must be retracted to allow for insertion and removal of the ball valve member. Spacer ring 104 provides the feature of a retractable seat construction.

Another further embodiment of the seal ring of this invention is shown in FIG. 8 wherein the seal ring indicated generally at 114 is mounted in a seal ring carrier 116 that is provided with a seal retainer member 118 positioned over the inner portion of the seal ring. Seal ring carrier 116 is mounted in a groove 120 which is spaced radially outward from the flow passageway 20D. An annular seal ring 122 is mounted in the annulus portion of seal ring carrier 116 for sealing between the interior of the carrier and valve body 24D. Seal ring 114 is constructed with a substantially cylindrically shaped portion 124 referred to as a leg portion which is joined by curved portion 126 to radially disposed portion 128 referred to as a lip portion. The curved portion of seal ring 114 resides over a forming ring 130 supported in a groove around the face portion of carrier 116. Seal retainer member 118 is secured around the perimeter of carrier 116 and extends radially inward over seal ring curved portion 126. The placement of retainer 118 is such that it will retain seal ring 114 and forming ring 130 in carrier 116. Seal ring 114 is provided with a sharp annular edge 132 to contact the ball member spherical surface 40. The composition of seal ring 122 and forming ring 130 can be selected from temperature resistant non-metallic materials and from resilient or easily deformable metals to provide for sealing as well as high temperature resistance.

In the use and operation of the metallic seal ring structure of this invention, it is seen that such provides a one-piece annular metallic seal for a ball valve which can be utilized for both top entry and end entry style valves in a number of specific seat configurations. Because of the unique unitary and deformable all metal seal ring structure it functions as a seal and additionally as a spring or biasing device to urge itself into contact with the ball valve member. Additionally, because of the all metal structure, the seal ring will function to give a valve double block and bleed capability as well as being operational at elevated temperatures and high pressures at the same time.

What is claimed is:

1. A ball valve, comprising:
   (a) a valve body having inlet and outlet flow passageways and a valve chamber therebetween, a ball member having a passage therethrough mounted in said valve chamber for rotation between open and closed positions;
   (b) said valve chamber being located at the juncture of said flow passageways and having opposed end walls extending generally radially outward from said passageways, each of said end walls having an annular groove therein extending in general axial alignment with the longitudinal axis of said passageways, said groove being defined by a pair of parallel sides coaxial with the passageways and a bottom extending between the parallel sides in a perpendicular relation thereto; and (c) sealing means mounted in the grooves including a deformable annular metallic seal ring around each of said inlet and outlet passageways to form upstream and downstream seal rings, said seal rings each being of a generally right angled cross-section when in a free position and forming a leg portion and a free lip portion, said free lip portion extending generally transversely to the longitudinal axis of the flow passageways and having a relatively sharp inner annular edge portion contacting said ball member, said leg portion extending in general axial alignment with said passageways and anchored within the associated groove to secure said seal ring in position, said lip portion being resiliently deformed to a generally frusto-conical shape relative to the leg portion upon contact with said ball member in a preloaded position upon assembly of said valve with said sharp annular edge portion being in sealing engagement with said ball member.

2. The ball valve of claim 1, wherein said valve body has a removably mounted tailpiece having one of said grooves therein, and an annular seal between said valve body and said tailpiece.

3. The ball valve of claim 1, wherein:
(a) said ball member has a stem operably connected thereto and extending through an aperture in said valve body; and
(b) a journal in said valve body and a journal means on said ball member opposite to said stem to support said ball member for rotation about the axis of said stem.

4. The ball valve of claim 1, wherein said lip portion has an inner annular surface intersecting both sides of said seal ring at an angle relative to said sides with the diameter of said annular surface being the largest on the side of said seal ring which is adjacent said ball member and said sharp edge being at the juncture of said annular surface and said seal ring side which is adjacent to said ball member.

5. The ball valve of claim 1, wherein said valve body has an annular seal retainer member rigidly mounted in said valve chamber in a position extending generally transversly to said groove and over said seal ring lip portion to hold said leg portion and said seal ring in position.

6. The ball valve of claim 1, wherein an annular support member for the seal ring is mounted in each of the grooves and the leg portion of the associated seal ring is secured to the support member.

7. The ball valve of claim 6, wherein said lip portion has an inner annular surface intersecting both sides of said seal ring at an angle relative to said sides with the diameter of said annular surface being the largest on the side of said seal ring which is adjacent said ball member and said sharp edge being at the juncture of said annular surface and said seal ring side which is adjacent to said ball member.

8. A ball valve comprising:
(a) a valve body having inlet and outlet flow passageways and a valve chamber therebetween, said body having a main body portion and a removable tailpiece, a ball member having a passageway therethrough and being mounted by journals on opposite sides thereof in said valve chamber for rotation between open and closed positions of said ball passageway relative to said inlet and outlet flow passageways;
(b) said valve chamber being located at the juncture of said flow passageways and including opposed end walls around said passageways, with said end walls each having a groove in a spaced relation around said passageways and extending in general axial alignment with the longitudinal axis of said passageways, said groove being defined by a pair of parallel sides coaxial with the passageways and a bottom extending between the sides in a perpendicular relation thereto; and
(c) a pair of unitary deformable annular metallic seal rings mounted in said valve chamber with one seal ring around each of said passageways forming upstream and downstream seals, and seal rings each having a generally cylindrical outer portion secured within the associated groove and a generally radially disposed portion curving inwardly from the outer portion, said radially disposed portion being substantially perpendicular to said cylindrical outer portion when said seal ring is in a free and unrestrained position, said radially disposed portion terminating at an annular inner edge portion formed by an annular surface intersecting opposed sides of said seal ring wherein the side of said seal ring adjacent said ball member has a larger diameter than the opposite side thereof and a sharp inner annular edge is formed at the larger diameter, said seal ring being deformed upon assembly of said valve to a substantially frusto-conical shape so that said sharp inner annular edge is in sealing engagement with said ball member, said seal ring being deformed and functioning as a spring to urge said sharp inner annular edge into sealing contact with said ball member.

* * * * *